(12) United States Patent
Tabatabaee et al.

(10) Patent No.: US 9,356,868 B2
(45) Date of Patent: May 31, 2016

(54) CONGESTION DETECTION AND MANAGEMENT AT CONGESTION-TREE ROOTS

(71) Applicant: BROADCOM CORPORATION, Irvine, CA (US)

(72) Inventors: Vahid Tabatabaee, Potomac, MD (US); Bruce Hui Kwan, Sunnyvale, CA (US)

(73) Assignee: Broadcom Corporation, Irvine, CA (US)

( * ) Notice: Subject to any disclaimer, the term of this patent is extended or adjusted under 35 U.S.C. 154(b) by 296 days.

(21) Appl. No.: 14/054,766

(22) Filed: Oct. 15, 2013

(65) Prior Publication Data

US 2015/0055478 A1 Feb. 26, 2015

Related U.S. Application Data

(60) Provisional application No. 61/869,509, filed on Aug. 23, 2013.

(51) Int. Cl.
*H04L 1/00* (2006.01)
*H04L 12/801* (2013.01)
*H04L 12/825* (2013.01)

(52) U.S. Cl.
CPC .............. *H04L 47/11* (2013.01); *H04L 47/266* (2013.01); *H04L 47/29* (2013.01)

(58) Field of Classification Search
CPC . H04L 47/11; H04L 47/6215; H04L 43/0852; H04L 12/24; H04L 47/30; H04L 47/10; H04L 12/5693
See application file for complete search history.

(56) References Cited

U.S. PATENT DOCUMENTS

| | | | | |
|---|---|---|---|---|
| 2004/0223452 | A1* | 11/2004 | Santos | H04L 47/10 370/229 |
| 2006/0092845 | A1* | 5/2006 | Kwan | H04L 12/5693 370/235 |
| 2008/0259798 | A1* | 10/2008 | Loh | H04L 45/302 370/235 |

* cited by examiner

*Primary Examiner* — Yemane Mesfin
*Assistant Examiner* — Abdelillah Elmejjarmi
(74) *Attorney, Agent, or Firm* — McDermott Will & Emery LLP (57) ABSTRACT

A device for performing congestion detection and management at a node of a network may include a congestion management module to monitor an arrival and a departure rate of data packets associated with a queue, a queue size, or a rate of change of the queue size. The congestion management module may identify the queue as a congested queue by one of determining that the arrival rate of the data packets associated with the queue is larger than the departure rate of the data packets associated with the queue, the queue size is larger than a first threshold, or the rate of change of the queue size is larger than a second threshold. The congestion management module may identify the congested queue as a congestion root by determining that the congested queue is not affected by a flow-control signal. A queue buffer temporarily stores data packets associated with the queue.

20 Claims, 5 Drawing Sheets

CONGESTION DETECTION AND MANAGEMENT AT CONGESTION-TREE ROOTS

CROSS-REFERENCE TO RELATED APPLICATIONS

This application claims the benefit of priority under 35 U.S.C. §119 from U.S. Provisional Patent Application 61/869,509 filed Aug. 23, 2013, which is incorporated herein by reference in its entirety.

TECHNICAL FIELD

The present description relates generally to congestion management in data communication networks, and more particularly, but not exclusively, to congestion detection and management in data center networks.

BACKGROUND

Many networks such as data-center networks may strive for reducing data loss associated with various data traffic, desirably, to zero. The traffic congestion at any node (e.g., switch) may be caused by an input data rate that is too high for the node to handle and can result in a backlog in that node. Data center networks may use two different methods for congestion management: Link level flow control using methods such as a packet flow control (PFC); and/or network level congestion management such as quantized congestion notification (QCN), data center transmission control protocol (DCTCP), or other protocols that can control traffic sources rates.

The network level congestion management is able to control and remove congestion at network hot spots in long term by, for example, reducing traffic rate at the source. However, in the short term the link level flow control can create and expand congestion trees that are rooted in network hot spots, before the network level congestion management takes control and reduces the data rate of sources that are causing congestion. Creation of congestion trees by the link level flow control can cause data rate reduction for innocent flows (e.g., flows that do not contribute to the congestion) that are in the congestion tree.

The network level congestion management may employ a set of parameters that we call queue-set (Q-set) for detecting congestion level at each queue associated with a node. The Q-set parameters are different for different protocols. For example, in the DCTCP protocol, K parameter is a threshold on queue buffer usage; in the Early Congestion Notification (ECN) protocol, Min and Max thresholds are used as two thresholds on the buffer usage; and in QCN protocol, Qeq is used as a threshold for queue buffer usage and W is a weight factor to consider rate of change of the queue size.

Congestion notification in network level management may be performed through direct messaging to the source or through packet marking. For example, in the QCN protocol, explicit control messages including congestion notification messages (CNMs) are communicated to the sources (e.g., servers) to reduce their rate, whereas in the DCTCP or ECN protocols, data packets may be marked at a congested node to indicate that the path from the source to the destination was congested.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced using one or more implementations. In one or more instances, well-known structures and components are shown in block diagram form in order to avoid obscuring the concepts of the subject technology.

In one or more aspects, methods and implementations for network congestion detection and measurement are described. The subject technique may avoid data packet loss without reducing data rate and increasing delay of innocent flows that are not contributing to the congestion. Among a number of nodes (e.g., switches) of the network that are in the path of a data packet from a source (e.g., a first endpoint) to a destination (e.g., a second endpoint), a switch with a congested queue may be the root of the congestion. The subject technology identifies the congestion root and takes action to control the congestion by only affecting the flows that are contributing to the congestion at the congestion root.

Figure 1:
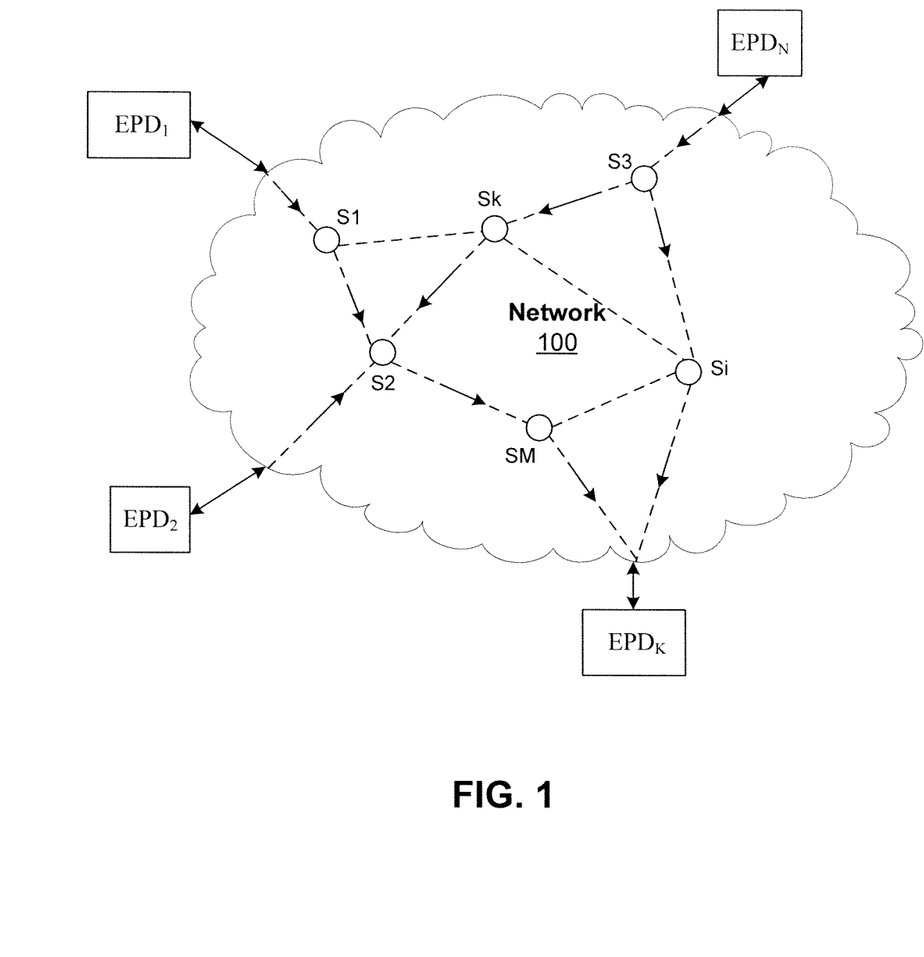
FIG. 1 illustrates an example of a network with congestion detection and management in accordance with one or more implementations.

FIG. 1 illustrates an example of a network 100 with congestion detection and management in accordance with one or more implementations of the subject technology. Examples of the network 100 may include an Ethernet network such as a data-center network, an enterprise network, and the Internet. The network 100 includes a number of devices (e.g., nodes) such as multiple switches (e.g., $S_1, S_2 \ldots S_M$) and a number of endpoint devices (e.g., $EPD_1, EPD_2 \ldots EPD_N$). An endpoint device may be a source (e.g., sending endpoint device) and/or a destination (e.g., receiving endpoint) of a data or gateways to other networks. Packets transmitted by an endpoint device may hop through a number of switches before reaching a destination endpoint device.

In one or more implementations of the subject technology, a switch (e.g., $S_2$) may receive from one or more other switches data packets that may originate from one or more sources. In some embodiments, for a specific time period, as shown in FIG. 1, arriving data packets may be received at the switch S2 from switches $S_1$ and $S_K$ and the endpoint device $EPD_2$ and be destined to the switch $S_M$. This may cause backlogs occur in one or more queues associated with the switch S2, which is configured to buffer packets that are destined to other nodes such as the switch SM. A queue at switch S2 may be considered as a congested queue if an arrival rate of the arriving data packets to that queue at the switch $S_2$ is larger than the departure rate of the data packets from that queue in switch $S_2$. When link level flow control is used in network between switches, the congestion at any switch may propagate through the network 100 and create a congestion tree which originates from a tree root (e.g., a switch). If the congestion is not properly managed, data communication through the whole network may be disrupted. In one or more aspects, the queue at switch S2 may be considered as a congested queue if one of a queue size or a rate of change of the queue size is larger than a corresponding threshold (e.g., a first or a second threshold).

In one or more implementations, the disclosed congestion management technique is directed to first detecting one or more congestion tree roots (hereinafter "congestion roots") and then controlling the congestion without affecting the data flows that are not contributing to the congestion at the one or more congestion roots. The existing congestion management solutions, however, may reduce traffic rate at the source, which may affect all flows and cause data rate reduction for innocent flows of the congestion tree. In some aspects, the identification of the congestion root may be performed by determining that the congested queue is not affected by a flow-control signal such as a link-level flow control (FC)-XOFF signal, or by determining that the departure rate of the data packets associated with the congested queue has not been reduced during a predetermined time period, as discussed in more detail herein.

Figure 2:
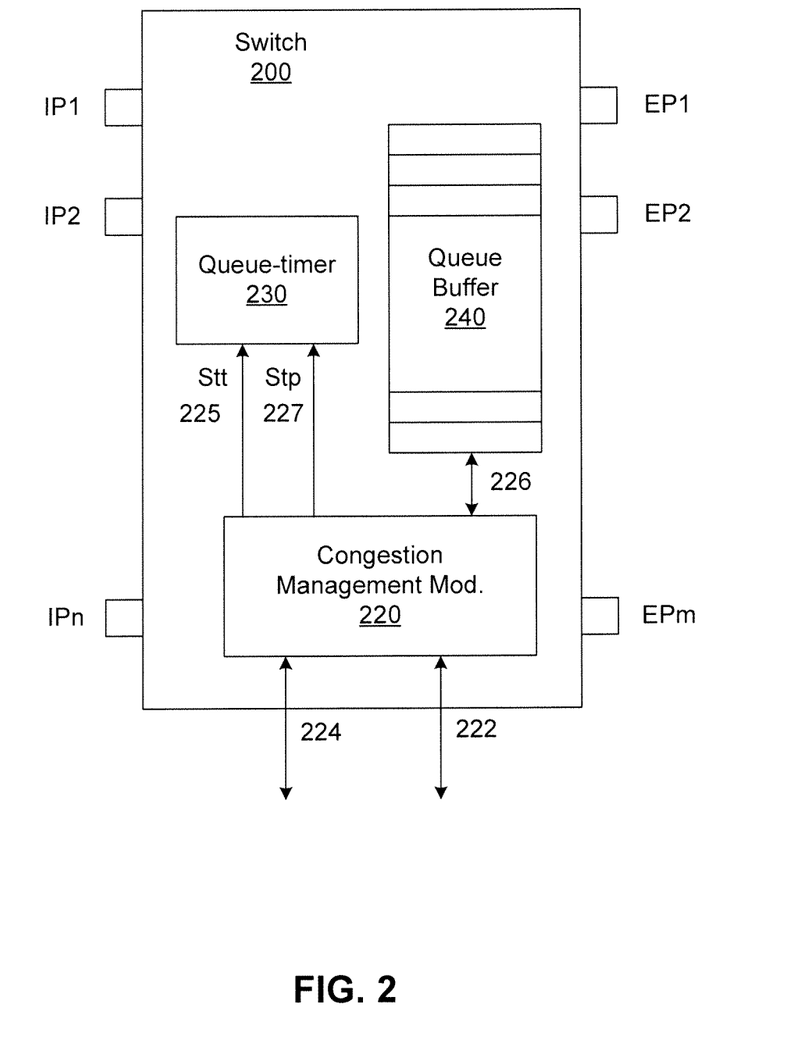
FIG. 2 illustrates an example of a switch of a network with congestion detection and management in accordance with one or more implementations.

FIG. 2 illustrates an example of a switch 200 of a network with congestion detection and management in accordance with one or more implementations of the subject technology. The switch 200 includes a number of ingress (input) ports IP1-IPn and multiple egress (output) ports EP1-EPm. The switch 200 may further include hardware, firmware, and/or software component. In some embodiments, the hardware or firmware may be implemented with one or more application specific integrated circuits (ASICs) and/or one or more field-programmable logic arrays (FPGAs). In particular, the switch 200 may include a congestion management module 220, one or more queue-timers 230 and one or more queue buffers 240. The congestion management module 220 may be implemented in hardware and/or software, which can be executed by a processor. A queue may correspond to a queue buffer (e.g., 240) or other resources used in a switch. The queue buffer may correspond to an egress port (e.g., one of EP1-EPm) that may receive data packets arrived at one of the ingress ports IP1-IPn. The queue buffer 240 may comprise a portion of memory such as RAM, DRAM, SRAM, flash memory, or any other type of memory existing in the switch 200.

In one or more implementations, the congestion management module 220 may monitor one or more characteristics of the queue including an arrival rate and a departure rate of data packets associated with a queue and/or a queue size, a rate of change of the queue size, and/or a queue delay associated with the queue. The queue may be a queue corresponding to the queue buffer 240. The congestion management module 220 may identify the queue as a congested queue. For this, the congestion management module 220 may compare the arrival rate and departure rates of the data packets associated with the queue. If the determination was made that arrival rate is larger than the departure rate of the data packets associated with the queue, the queue is identified as a congested queue. In one or more aspects, buffer usage of the queue buffer 240 may be an indication that the corresponding queue is congested. In some aspects, the congestion management module 220 may identify the queue as a congested queue by determining that one of the queue size, the rate of change of the queue size, or the queue delay is larger than a corresponding threshold. The congestion management module 220 may use a parameter (e.g., a data center transmission control protocol (DCTCP) parameter such as a K parameter) indicating a threshold associated with the current fill-level of the queue buffer 240 to detect congestion and determine whether it is time to send congestion notification signals to end points. In one or more aspects, the congestion management module 220 may send a congestion notification signal if the K parameter of the queue buffer 240 reaches a first threshold (e.g., 80 Kbytes). However, if the congested queue is the congestion root, the congestion management module 220 may move faster and start sending congestion notification signals to other nodes when K parameter of the queue buffer 240 reaches a second threshold (e.g., 50 Kbytes) lower than the first threshold used when the congested queue was not the congestion root.

The congested queue may or may not be the root of the current congestion. The congestion management module 220 can determine this by identifying the congested queue as the congestion root if the congested queue is not affected by a flow-control signal (e.g., 224) such as an FC-XOFF signal. The flow-control signal 224 may be received at a node (e.g., a switch such as 200) of the network (e.g. 100 of FIG. 1) for a queue from its downstream node (e.g., link partner) that is in the congestion tree, to signal the upstream node of congestion and to slow down sending data packets by reducing their data rate. Therefore, a node that is congested, but has not received any flow-control signals, is a congestion root.

In some aspects, the congestion management module 220 may determine that the congested queue is not affected by a flow-control signal based on information retrieved from the flow-control signals 224 received at the switch 200. The information retrieved from the flow-control signals 224 may include a rate of the received flow-control signals 224 and an average time period that the congested queue has been in an XOFF state as further discussed herein. The congestion management module 220 may control the congestion by utilizing a state variable that indicates that the congested queue is the congestion root, for example, by notifying the sources of the corresponding flows contributing to the congestion root sooner and faster regarding the congestion of the node if the node is a root of the congestion.

Two distinct Q-Set of parameters may be used for congestion detection, Q-Set_Root and Q-Set_non_Root. The Q-Set_Root are more sensitive parameters that are used for nodes that can be the root of the congestion (e.g., congestion-root-bit=1). The Q-Set_non_Root are less strict parameters that are used for nodes that are not the root of congestion (e.g., congestion-root-bit=0). In one or more implementations, the state variable may be a congestion-root-bit for a queue, and the congestion management module 220 can set the congestion-root-bit to zero upon receipt of a link level flow control for that queue from another switch. The queue-timer 230 may be configured to measure a time-laps based on start and stop signals 225 and 227 received from the congestion management module 220. The queue-timer 230 can measure a time-lapse since a last FC-XOFF (e.g., FC-XOFF set to zero) state of the congested queue. The queue-timer 230 may be started, by the start signal 225, to count down from a predetermined count (e.g., a count corresponding to 100 micro-seconds). The congestion management module 220 may issue a start signal 225 upon resetting of the FC-XOFF state to zero. The congestion management module 220 may monitor the queue-timer 230, and set the congestion-root-bit to one upon detecting that a count (e.g., a reading) of the queue-timer 230 has reached zero. The congestion-root-bit is set to zero upon receiving stp signal 227. In some aspects, the queue-timer 230 may be replaced by a moving average filter that can track the average time that a queue has been in the XOFF state.

Figure 3:
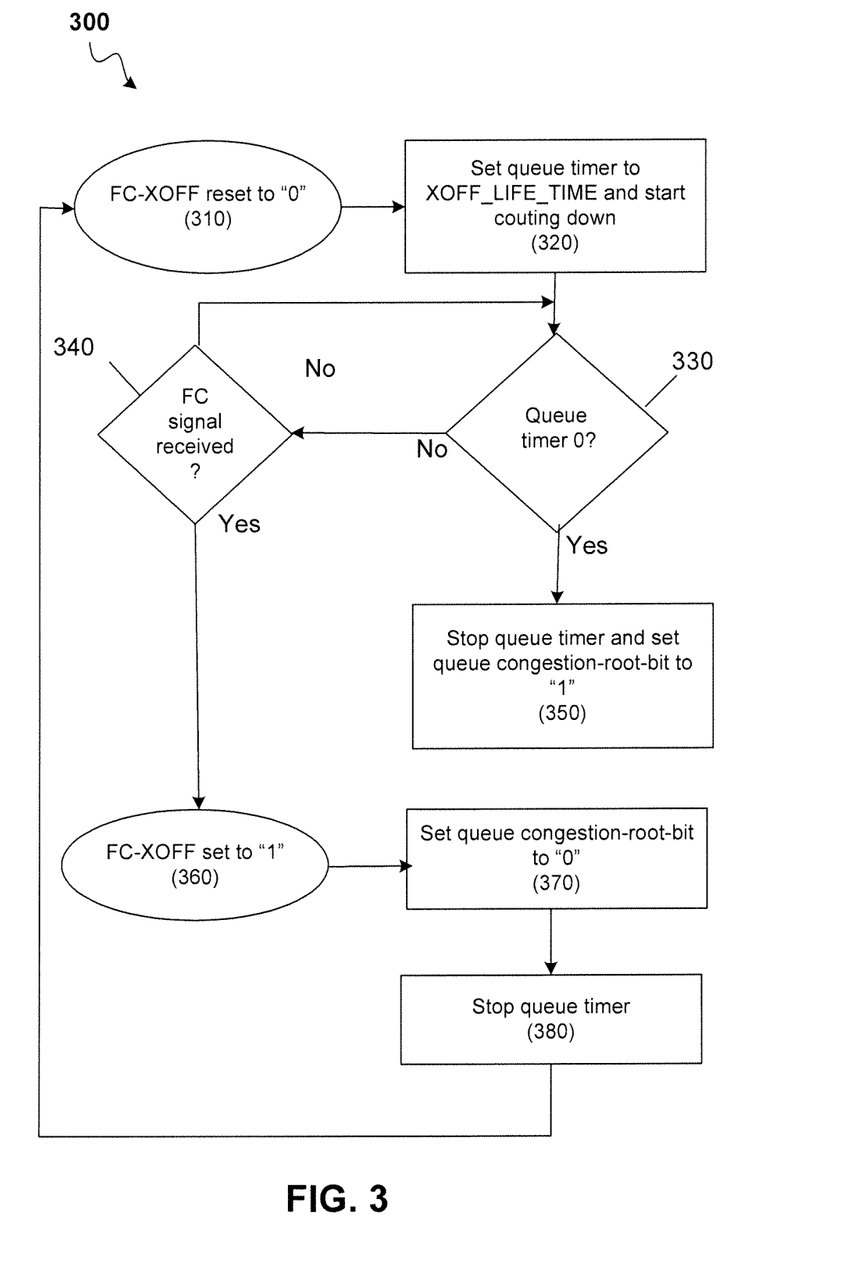
FIG. 3 illustrates a flow diagram of an example algorithm for network congestion-tree roots detection in accordance with one or more implementations.

FIG. 3 illustrates a flow diagram of an example algorithm 300 for network congestion-tree roots detection in accordance with one or more implementations of the subject technology. The congestion management module 220 of FIG. 2 may initially reset the FC-XOFF state to zero (310), set the queue timer 230 to a predetermined count (e.g., corresponding to XOFF_LIFE_TIME=100 micro-seconds), and send the start signal 225 of FIG. 2 to start the queue timer 230 of FIG. 2 (320). The count of the queue timer 230 may be monitored by the congestion management module 220 (330). If the count of the queue-timer 230 has reached zero, the congestion management module 220 may stop the queue-timer 230 and set the congestion-root-bit to one (350). If, at control operation 330, the count of the queue-timer 230 has not reach zero, the congestion management module 220 may check for an arrival of a new flow-control signal (340), if a new flow-control signal has not arrived, the congestion management module 220 may go back to monitoring the count of the queue-timer 230 (330). However, if at control operation 340, it is determined a new flow-control signal has arrived, the FC-XOFF state is set to one (360), the congestion management module 220 may set the congestion-root-bit of the to zero (370), stop the queue timer 230 by sending the stop signal 227 to the queue timer 230 (380). After operation 380, the control may be transferred to operation 310.

Figure 4:
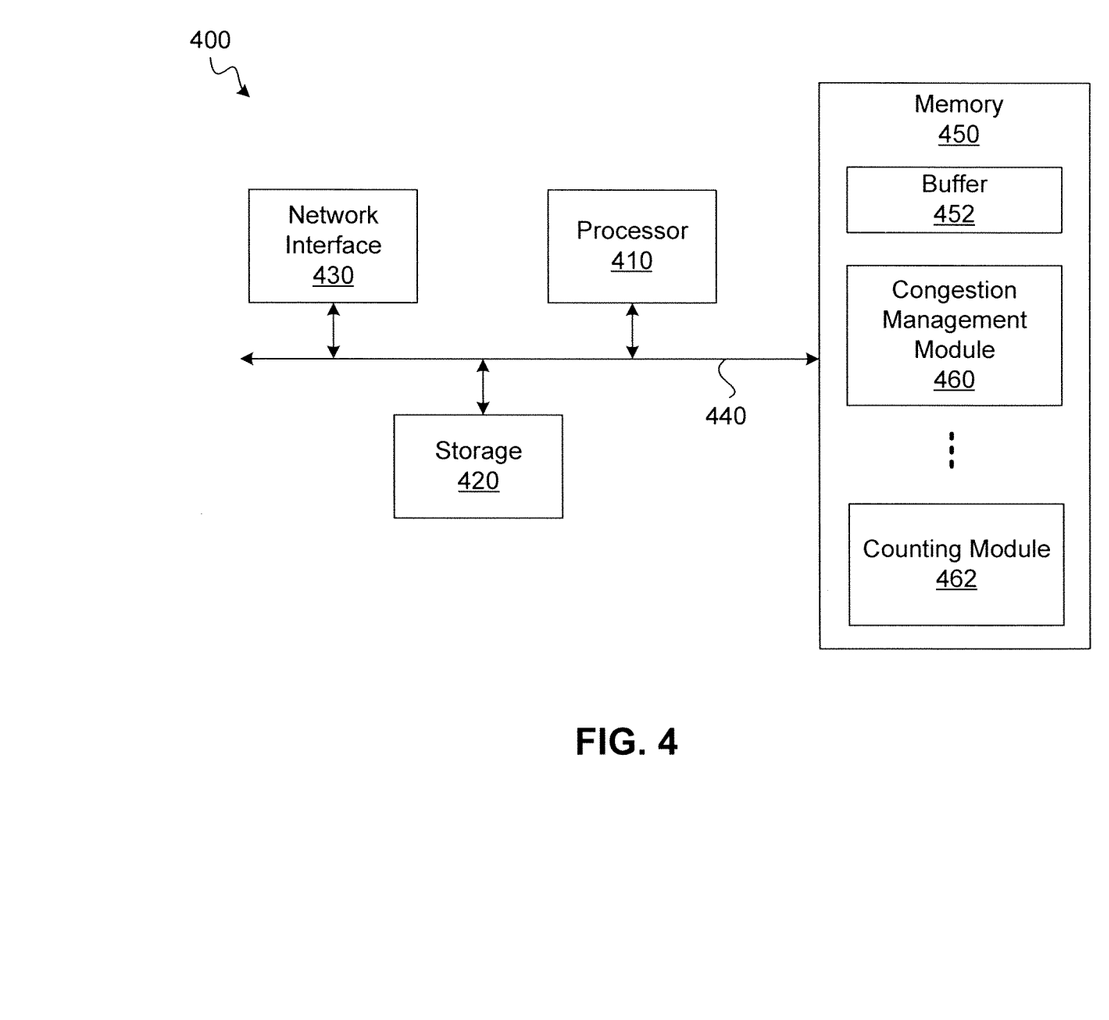
FIG. 4 illustrates an example of a system for congestion detection and management in a switch in accordance with one or more implementations.

FIG. 4 illustrates an example of a system 400 for congestion detection and management in a switch in accordance with one or more implementations of the subject technology. The system 400 may include a processor 410, a storage device 420, a network interface 430, and memory 450, coupled to one another via a bus 440. The processor 410 may include a general-purpose processor, one or more hardware cores, one or more controllers, or any other type of processor. The network interface 330 may perform communications with other devices, such as other switches or endpoint devices (e.g., of the network 100 of FIG. 1). The communications may include receiving/sending data packets and/or control packets. The memory 450 may include RAM, DRAM, SRAM, T-RAM, Z-RAM, TTRAM, flash memory, or any other type of memory. The storage device 420 may include a disk drive, flash memory, or any other storage media. The memory 450 may include a buffer 452 (e.g., queue buffer 240 of FIG. 2), and program modules such as a congestion management module 460 and a counting module 462. The congestion management module 460 and the counting module 462, when executed by a processor (e.g., the processor 410) can perform some or all of the functionalities of the congestion management module 220 and the queue-timer 230 of FIG. 2, respectively. In other words, in one or more implementations, some or all of the functionalities of the congestion management module 220 and the queue-timer 230 may be implemented in software, which may be included in the software modules 460 and 462 or stored in another storage device and executed by a processor.

Figure 5:
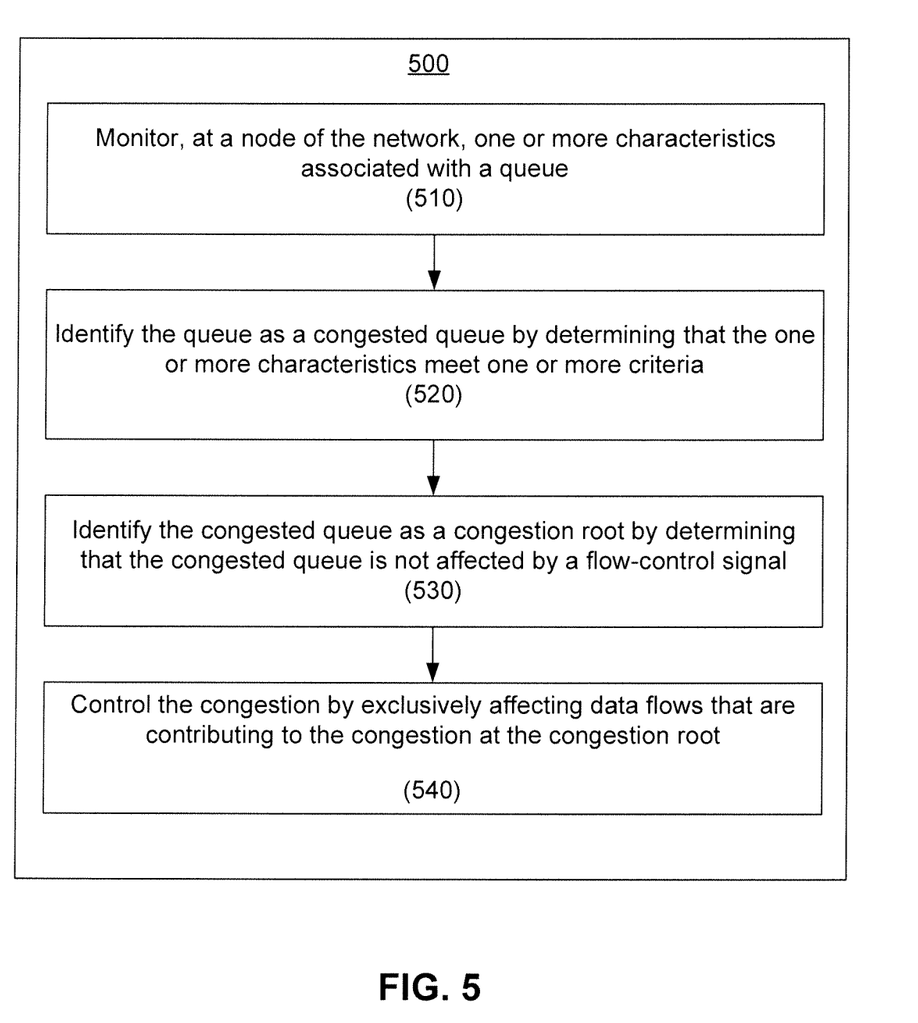
FIG. 5 illustrates an example of a method for congestion detection and management in accordance with one or more implementations.

FIG. 5 illustrates an example of a method 500 for congestion detection and management in accordance with one or more implementations of the subject technology. The steps of the method 500 do not need to be performed in the order shown and one or more steps may be omitted. At a node (e.g., a switch such as S2 of FIG. 1) of a network (e.g., 100 of FIG. 1), one or more characteristics of a queue including a size and/or a rate of change of the queue size of a queue (e.g., a queue associated with a queue buffer 240 of FIG. 2) may be monitored (510). The queue may be identified as a congested queue by determining (by 220 of FIG. 2) that one or more criteria are met, for example, one of the queue size and/or the rate of change of the queue size is larger than a corresponding threshold (520). The congested queue may be identified (by 220 of FIG. 2) as a congestion root by determining that the congested queue is not affected by a flow-control signal (530). The congestion may be controlled without affecting data flows that are not contributing to the congestion at the congestion root (540).

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature of the subject technology.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In some implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

Those of skill in the art would appreciate that the various illustrative blocks, modules, elements, components, and methods described herein may be implemented as electronic hardware, computer software, or combinations of both. To illustrate this interchangeability of hardware and software, various illustrative blocks, modules, elements, components, and methods have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

A phrase such as "an aspect" does not imply that such aspect is essential to the subject technology or that such aspect applies to all configurations of the subject technology. A disclosure relating to an aspect may apply to all configurations, or one or more configurations. An aspect may provide one or more examples of the disclosure. A phrase such as an "aspect" may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples of the disclosure. A phrase such an "embodiment" may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples of the disclosure. A phrase such as a "configuration" may refer to one or more configurations and vice versa.

The word "exemplary" is used herein to mean "serving as an example, instance, or illustration." Any embodiment described herein as "exemplary" or as an "example" is not necessarily to be construed as preferred or advantageous over other embodiments. Furthermore, to the extent that the term "include," "have," or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A method for congestion detection and management, the method comprising:
    monitoring, at a node of a network, one or more characteristics associated with a queue;
    identifying the queue as a congested queue by determining that the one or more characteristics of the queue meet one or more criteria;
    identifying the congested queue as a congestion root by determining that a departure rate of the data packets associated with the congested queue has not reduced during a predetermined time period; and
    controlling the congestion without affecting data flows that are not contributing to the congestion at the congestion root,
    wherein the one or more characteristics of the queue comprises a queue size associated with the queue and a rate of change of the queue size, and wherein the one or more criteria includes at least one of the queue size or the rate of change of the queue size being larger than a respective first or second threshold.

2. The method of claim 1, wherein the node comprises a switch and the network comprises a data center network.

3. The method of claim 1, wherein the one or more characteristics of the queue further comprises at least one of an arrival rate and a departure rate of data packets associated with the queue or a queue delay associated with the queue, and wherein the one or more criteria further includes the queue delay being larger than a corresponding threshold or that the arrival rate of the data packets associated with the queue being larger than the departure rate of the data packets associated with the queue.

4. The method of claim 1, further comprising identifying the congested queue as the congestion root by determining that the congested queue is not affected by a flow-control signal, wherein the flow-control signal comprises a link-level flow-control signal including a flow control (FC)-XOFF signal, and wherein the method further comprises determining that the congested queue is not affected by the flow-control signal based on information retrieved from flow-control signals received at the node.

5. The method of claim 4, wherein the information retrieved from the received flow-control signals comprise a rate of the received flow-control signals and an average time period that the congested queue was in an XOFF state.

6. The method of claim 4, wherein controlling the congestion comprises using a state variable to indicate that the congested queue is the congestion root, and wherein the state variable is identifiable by one or more sources of corresponding flows contributing to the congestion root, and notifying the one or more sources of the corresponding flows contributing to the congestion root regarding the congestion of the node if the node is a root of the congestion.

7. The method of claim 6, wherein the state variable comprises a congestion-root-bit, wherein the method further comprises setting the congestion-root-bit to zero upon receipt of a control signal from another node.

8. The method of claim 6, wherein the method further comprises:

using a queue-timer to measure a time-lapse since a last XOFF state of the congested queue; and starting a count-down of the queue-timer from a predetermined count upon resetting the FC-XOFF state to zero.

9. The method of claim 8, further comprising:

setting the congestion-root-bit to one upon a count of the queue-timer reaching zero; and stopping the count-down of the queue-timer.

10. A device for performing congestion detection and management at a node of a network, the device comprising:

a congestion manager to:

monitor at least one of an arrival rate and a departure rate of data packets associated with a queue, a queue size, or a rate of change of the queue size or a queue delay associated with the queue;

identify the queue as a congested queue by determining that at least one of the queue size, the rate of change of the queue size, or the queue delay is larger than a corresponding threshold; and identify the congested queue as a congestion root by determining that a departure rate of the data packets associated with the congested queue has not reduced during a predetermined time period; and a queue buffer configured to temporarily store data packets associated with the queue.

11. The device of claim 10, wherein the node comprises a switch and the network comprises a data center network, and wherein the congestion manager is further configured to control the congestion without affecting data flows or affecting the data flows less severely when the data flows are not contributing to the congestion at the congestion root.

12. The device of claim 10, wherein the congestion manager is to identify the queue as a congested queue by determining that the arrival rate of the data packets associated with the queue is larger than the departure rate of the data packets associated with the queue.

13. The device of claim 10, wherein the congestion manager is further to identify the congested queue as the congestion root by determining that the congested queue is not affected by a flow-control signal, wherein the flow-control signal comprises a link-level flow-control signal including a flow-control (FC)-XOFF signal, and wherein the congestion manager is further to determine that the congested queue is not affected by the flow-control signal based on the information retrieved from flow-control signals received at the node.

14. The device of claim 13, wherein the information retrieved from the received flow-control signals comprise a rate of the received flow-control signals and an average time period that the congested queue was in an XOFF state.

15. The device of claim 13, wherein the congestion manager is further to control the congestion by utilizing a state variable that indicates that the congested queue is the congestion root, and wherein the state variable is identifiable by one or more sources of corresponding flows contributing to the congestion root, and notifies the one or more sources of the corresponding flows contributing to the congestion root regarding the congestion of the node if the node is a root of the congestion.

16. The device of claim 15, wherein the state variable comprises a congestion-root-bit, and wherein the congestion manager is further to set the congestion-root-bit to zero upon receipt of a control signal from another node.

17. The device of claim 15, further comprising a queue-timer measuring a time-laps based one or more signals received from the congestion manager, wherein the queue-timer is to measure a time-lapse since a last XOFF state of the congested queue, and wherein a count-down of the queue-timer from a predetermined count is started by a start signal from the congestion manager upon resetting the FC-XOFF state to zero.

18. The device of claim 17, wherein the congestion manager is further to set a congestion-root-bit to one and to cause stopping the count-down of the queue-timer upon a count of the queue-timer reaching zero.

19. A system for performing congestion detection and management at a node of a network, the system comprising:

memory configured to store one or more program modules;

one or more processors coupled to the memory and configured to execute the one or more program modules to perform:

monitoring at least one of an arrival rate and a departure rate of data packets associated with a queue, a queue size, a rate of change of the queue size, or a queue delay associated with the queue;

identifying the queue as a congested queue by determining that the arrival rate of the data packets associated with the queue is larger than the departure rate of the data packets associated with the queue or by determining that at least one of the queue size, the rate of change of the queue size, or the queue delay is larger than a corresponding threshold;

identifying the congested queue as a congestion root by determining that a departure rate of the data packets associated with the congested queue has not reduced during a predetermined time period; and controlling the congestion without affecting data flows that are not contributing to the congestion at the congestion root.

20. The system of claim 19, wherein the one or more processors are further to execute the one or more program modules to perform:

controlling the congestion using a state variable to indicate that the congested queue is the congestion root, and wherein the state variable is identifiable by one or more sources of corresponding flows contributing to the congestion root, and notifies the one or more sources of the corresponding flows contributing to the congestion root regarding the congestion of the node if the node is a root of the congestion.

* * * * *